3,193,449
EMULSION SIZE CONSISTING OF A TERPENE RESIN AND A REACTION PRODUCT OF A TERPINE RESIN AND USE FOR SIZING PAPER
Paul H. Aldrich, Greenville, Wilmington, Del., and Herman I. Enos, Jr., Fairville Hills, Pa., assignors to Hercules Powder Company, Wilmington, Del., a corporation of Delaware
No Drawing. Filed Mar. 23, 1962, Ser. No. 182,093
11 Claims. (Cl. 162—180)

This invention relates to novel sizing compositions and to the use of same for sizing paper, paperboard and like cellulosic materials.

A principal object of the invention is the provision of novel sizing compositions which can be used as substitutes and/or extenders for rosin size.

Another object of the invention is the provision of a method for the preparation of novel and effective sizing compositions from terpene polymers. The term "terpene polymers" is used herein interchangeably with the term "terpene resins."

In accordance with the invention, it has been found that terpene polymers can be converted to emulsions which are highly effective sizing agents for paper by admixing therewith from about 2% to about 100% by weight, based on the weight of terpene polymer, of the reaction product of an acidic compound containing the

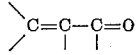

group with a terpene polymer or a hydrocarbon resin, and optionally rosin, and then at least partially saponifying the resulting mixture with aqueous alkali. The indicated reaction product can be separately formed and then admixed with the terpene polymer or, alternatively, may be formed in situ by reacting the terpene polymer with the acidic compound containing the

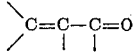

group.

The terpene polymers contemplated for use in accordance with the present invention are the polymeric resinous materials including the dimers as well as higher polymers obtained by polymerization and/or copolymerization of terpene hydrocarbons such as the alicyclic, monocyclic and bicyclic terpenes and their mixtures including alloocimene, carene, isomerized pinene, pinene, dipentene, terpinene, terpinolene, turpentine, a terpene cut or fraction, and various other terpenes. Hence, the term "terpene resin consisting of the polymerization products of terpene hydrocarbons" as used herein and in the claims refers to the polymeric resinous materials obtained by polymerization, as well as copolymerization, of a terpene hydrocarbon or mixture of terpene hydrocarbons. A particularly useful and economic starting material is the "sulfate turpentine" obtained as a by-product in the sulfate pulping process. Typical "sulfate turpentine" compositions are shown in the following table.

TABLE 1.—TYPICAL COMPOSITION OF TURPENTINES IN WEIGHT PERCENT

| Component | Gum turpentine | | | | |
|---|---|---|---|---|---|
| | Southern [1] | Western [3] | Indian [2] | | Honduras [2] |
| | | | P. excelsa | P. longifolia | |
| α-Pinene | 60–65 | 3 | 89 | 23 | 68 |
| Camphene | | | 4 | | 3 |
| β-Pinene | 25–35 | 30 | 3 | 4 | 5 |
| 3-carene | | 47 | | 65 | |
| Limonene | | | 1 | | |
| β-Phellandrene | | | | | 13 |
| Teprinolene | | 3 | | | |
| Others | 5–8 | 17 | 3 | 8 | 11 |

| Component | Wood turpentine | | | Sulfate turpentine | | | |
|---|---|---|---|---|---|---|---|
| | Southern [1] | Western [3] | Mexican [2] | Southern [3] | Western [2] | Northern [2] | Scandinavian [2] |
| α-Pinene | 75–80 | 8 | 70 | 60 | 34 | 72 | 48 |
| Camphene | 4–8 | | 6 | 2 | 2 | 2 | |
| β-Pinene | 0–2 | 6 | 2 | 20 | 9 | 16 | 6 |
| 3-carene | | 70 | 5 | 2 | 33 | 6 | 41 |
| Limonene | | | 7 | | 7 | | |
| β-Phellandrene | | | 2 | | | | |
| Terpinolene | | | 4 | | 3 | | |
| Others | 15–20 | 16 | 4 | 15 | 12 | 4 | 5 |

[1] Encyclopedia of Chemical Technology, vol. 14, The Interscience Encyclopedia, Inc., N.Y., 1955.
[2] Data determined by Hercules Powder Company.
[3] N. T. Mirov. Journal of FPRS, Feb., 1954, pp. 1–7.

The polymerization of the terpene or mixture of terpenes can be carried out in known manner with or without solvent and utilizing a known catalyst such as sulfuric acid, phosphoric acid, fuller's earth, boron trifluoride, amphoteric metal chlorides such as zinc chloride or aluminum chloride, and so on. The polymerization is preferably carried out under conditions which cause substantially all of the monoterpenes to react with minimum dimer formation.

While any of the polymers prepared by methods known to the art having molecular weights of about 272 (Rast) and above are operable herein, the preferred terpene polymers which are particularly effective in providing the improvements in accordance with the invention are characterized by molecular weight above 500 (Rast method) and softening point above 70° C. (Hercules, drop).

In the preparation of the reaction product of an acidic compound containing the

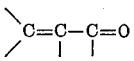

group with a terpene polymer or a hydrocarbon resin, the reactants are intimately mixed and heated to a temperature sufficient to effect the reaction. This will vary somewhat depending upon the character of the reactants used and other conditions of reaction; but, in general, temperatures from about 150° C. to about 250° C. will usually be found satisfactory. Preferred temperatures are from about 190° C. to about 210° C.

Peroxide catalysts may be used to promote reaction with less reactive resins or if it is desired to lower the reaction temperature. The reactants are desirably included in equimolar proportions. However, other proportions can be used according to the reactivity of the particular resin used.

In a typical reaction utilizing maleic anhydride as the acidic compound, the resin is warmed to 100–150° C., the desired amount of maleic anhydride is added, and the mixture is stirred and warmed as required to obtain the desired reaction temperature. When the reaction temperature exceeds 180° C., a reflux condenser with coolant at about 53° C. (M.P. maleic anhydride) is useful, though not essential, to prevent loss of maleic anhydride. Where desired, peroxide catalyst can be added when the maleic anhydride is added or later. Suitable peroxide catalysts include benzoyl peroxide, dicumyl peroxide, di-tert-butyl peroxide, and cumene hydroperoxide. These may be added in amounts up to 15% of the weight of the reaction mixture though economic consideration might limit the use to about 5%. All of the peroxide may be added at once, or a little may be added at a time until all has been added. Because of the cost of maleic anhydride, relative to resin, it is preferable to adjust conditions so that all the anhydride reacts.

After the reaction is complete, unreacted materials may be removed in any suitable manner as by solvent-solvent extraction using any of the various known polar-nonpolar solvent combinations known to the art of solvent-solvent extraction of organic materials. Aliphatic and/or alicyclic hydrocarbons including hexane, heptane, octane, cyclohexane, methylcyclohexane, and gasoline are suitable nonpolar solvents. Suitable polar phases include aqueous methanol, aqueous ethanol, aqueous isopropyl alcohol, and acetonitrile. Conditions are adjusted so that most of the maleic anhydride adduct will be found in the polar phase and most of the unreacted resin in the nonpolar phase. The adduct may be recovered by distilling the polar solvent or by precipitation with a large volume of water. When unreacted maleic anhydride is present, it can be removed by vacuum topping either before or after separation of the unreacted hydrocarbon resin.

The resins utilized herein for preparation of the above-described reaction products can be prepared by causing unsaturated hydrocarbon and/or terpene compounds to react in the presence of a suitable catalyst or activating agent or by the use of heat alone. The catalysts which can be used include acidic catalysts such as $AlCl_3$, $ZnCl_2$, $BF_3$, $H_2SO_4$, $H_3PO_4$ and acid clays, anionic catalysts such as metallic lithium and sodium or their alkyl derivatives, metal coordinate catalysts such as aluminum triisobutyl and $TiCl_4$ or $TiCl_3$, and free radical catalysts such as benzoyl peroxide, cumene hydroperoxide, tert-butyl hydroperoxide, and hydrogen peroxide. The resulting products may be viscous liquids or soft or resinous solids. Unsaturated hydrocarbon and terpene compounds from various sources may be used. Thus, relatively pure hydrocarbon compounds such as diolefins and olefins, or cyclic diolefins and cyclic olefins, or diolefins and substituted benzene hydrocarbons such as styrene, α-methyl-styrene, vinyltoluene or divinylbenzene, and terpene polymers such as those described hereinabove, or mixtures of these may be reacted together in controlled proportions to produce resins of predetermined characteristics. Various indeterminate mixtures of unsaturated hydrocarbons may also be reacted in this manner. Thus, cracked petroleum distillates or special fractions of cracked distillates may be used. Certain fractions or cuts of cracked petroleum distillates may also be mixed in varying proportions, and varying proportions of relatively pure unsaturated hydrocarbons of any or all of the classes mentioned above may be mixed with certain fractions of cracked distillate, to provide satisfactory materials for the resin formation. The choice of monomers and the condition of polymerization are selected preferably to give a resin which can be easily reacted with maleic anhydride and the like. Typical hydrocarbon resins which can be employed herein are as follows:

RESIN A 1,000 cc. of a cracked petroleum distillate having a boiling range of 30° to 220° C., resulting from the cracking of gas oil or kerosene at a temperature of 1400° F. at a time of contact of 0.8 second, was added slowly to a suspension of 15 grams of anhydrous aluminum chloride in 150 cc. of petroleum naphtha contained in a vessel provided with a rapid stirrer and an outer cooling jacket. The additions were made at such a rate that the temperature did not exceed 20° C. After the addition of the distillate, the stirring was continued for about 30 minutes following which there was added a stoichiometrical proportion of an alcoholic solution of sodium hydroxide sufficient to decompose the catalyst into aluminum hydroxide and sodium chloride. The stirring was continued for 15 minutes, and the precipitated solids were then removed by filtration. The clear filtrate was distilled to remove volatile components. The distillation residue, consisting of resin and oily polymers, was then subjected to hardening, during which operation a stream of superheated steam was passed through the residue in the manner of a steam distillation.

RESIN B

One volume of a mixture of 80 parts of butadiene with 20 parts of styrene was dissolved into 220 parts of methyl chlorine and the solution was cooled internally by the addition of an excess, approximately 100 parts, of solid carbon dioxide. When the solution had reached a temperature of approximately −78° C., a polymerization catalyst consisting of 0.5% solution of aluminum chloride in methyl chloride was added slowly to the rapidly stirred, cooled, butadiene-styrene solution to polymerize the olefins. After polymerization, the soluble polymer product was precipitated by the addition of isopropyl alcohol, and the ethyl chloride and alcohol were filtered from the solid, precipitated polymer. The solid polymer was dried to remove all traces of the alcohol and the methyl chloride.

RESIN C

To 300 parts of still bottoms (a product consisting primarily of dicyclopentadiene obtained by polymerizing a $C_5$ fraction resulting from the cracking of petroleum and distilling off the unpolymerized portion) were added 2.6 parts of boron trifluoride-ethyl ether complex containing 47% boron trifluoride. An exothermic reaction ensued causing a rise in temperature of up to 10° C. accompanied by a brownish-black coloration. The temperature of the mixture was then raised to approximately 165° C. at which point a second slight exothermic reaction took place and the mixture commenced to reflux with the development of a purple solution. After heating the purple solution to 190–210° C. for about an hour, or until tests indicated that the resin at room temperature was a brittle, green solid, the mixture was heated to 215–225° C. for about one hour while a stream of air was passed through the mixture. Following this operation, the product was allowed to cool. A brown, brittle thermoplastic resin, melting at 126–132° C., was obtained in about 90% yield.

RESIN D

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: benzene, 100 K.B. value; n-heptane, 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% nonvolatile matter as described in earlier parts of this specification. The resulting product had a viscosity of 0.9 poise, and the nonvolatile portion thereof had an average molecular weight of about 3,000.

Acidic compounds containing the

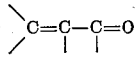

group suitable for use herein are the α,β-unsaturated polybasic carboxylic acids such as maleic, fumaric citraconic, itaconic and aconitic acids and the α,β-unsaturated monobasic carboxylic acids such as acrylic, methacrylic, α-crotonic and β-crotonic acids. Derivatives of the acids such as the anhydrides, acrylonitrile, etc., can also be used. The anhydrides are particularly useful.

The invention also contemplates the formation of the reaction product of the terpene polymer and the acidic compound containing the

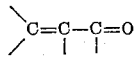

group in situ. In such case, the terpene polymer can be reacted with an amount of the acidic compound containing the

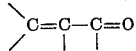

group sufficient to provide the desired amount of reaction product in admixture with the terpene polymer. This will usually require from about 0.5% to about 10%, and preferably from about 1% to about 5% by weight, based on the weight of terpene polymer, of the acidic compound. In some cases it may be desirable to react the terpene polymer substantially completely with the acidic compound and then add additional terpene polymer as desired. In such case, more of the acidic compound would be required, e.g., from about 10% to about 27% by weight, based on the weight of the terpene polymer.

The in situ reaction of the terpene polymer with the acidic compound will be carried out at a suitably elevated temperature which will fall generally within the range from about 150° C. to about 200° C., the preferred range being from about 190° C. to about 210° C. The reaction period may vary between about ¼ hour and 10 hours, preferably between about 1 hour and 5 hours, depending upon the temperature employed. Various inert solvents may, if desired, be employed. Thus, for example, tetrahydronaphthalene, decahydronaphthalene, Hi-flash naphtha and the chlorinated diphenyls may be employed. An inert atmosphere such as CO₂ or N₂ may also be used. Peroxide catalysts may be used to give a faster or more complete reaction or to lower the reaction temperature.

The reaction product of the acidic compound containing the

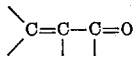

group and the hydrocarbon resin or terpene polymer, if separately formed as described above, is intimately admixed with the terpene polymer as by melting. If formed in situ, no further mixing is required unless it is desired to incorporate further amounts of reaction product or terpene polymer. The amount of reaction product to be admixed with the terpene polymer will depend upon a number of factors including the nature of the polymer, the nature of the reaction product, the manner of use, and so on. In general, however, amounts from about 2% to about 100% by weight, based on the weight of terpene polymer, will be satisfactory. This can be made up entirely of separately formed reaction product or in situ formed reaction product or partly of separately formed reaction product and partly of in situ formed reaction product in any desired proportions.

The mixture of terpene polymer and reaction product of an acidic compound containing a

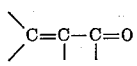

group with a hydrocarbon resin or terpene polymer can be converted to an emulsion-type size containing up to about 70% total solids by partial saponification with aqueous alkali, i.e., alkali metal hydroxides and carbonates. In the preparation of these emulsions, the alkali in a small amount of water is added slowly with efficient stirring to the molten resin or mixture of resins, preferably in an amount sufficient to neutralize from about 60% to about 100% of the acidity of the mixture. It is preferred to have the resin at 120–140° C. at the start of the addition though the temperature quickly falls to 100° C. or less. Heat is supplied as required to keep the temperature at 85–100° C. during the addition of alkali. When this addition is complete, the total solids will be 70–95%. The temperature is then adjusted as required to give adequate viscosity during final addition of water to invert the water-in-oil emulsion to an oil-in-water emulsion.

As is well known in the art of making stable oil-in-water emulsions with small particle size by inversion, certain materials require a high energy input by stirring during inversion, and this cannot be done if the water-in-oil emulsion is too fluid. Thus, when a low-melting resin (30–40° C.) with a low-melt viscosity is used, it is sometimes necessary to lower the temperature to 25° C. or less before inversion. Inversion is normally complete when the total solids are reduced to 45–55%. Total solids of the inverted emulsion can then be adjusted downward at will to any desired level by simple addition of water.

Emulsifiability of the mixture of terpene polymer and reaction product can be improved by increasing the proportion of the latter ingredient and/or by adding rosin and partially saponifying the rosin along with the other components of the mixture. The invention thus contemplates emulsion-type sizes containing the partially saponified mixture of terpene polymer and the indicated reaction product, together with a desired amount of partially saponified rosin. As a further variation of the in situ formation of the reaction product, rosin can be added to the terpene polymer and the terpene polymer—rosin mixture reacted with the acidic compound containing the

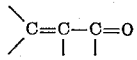

group to form reaction products with both the terpene polymer and the rosin.

While the use of rosin in the preparation of these emulsions is not essential, it is preferred since it permits a reduction in the amount of reaction product of an acidic compound containing a

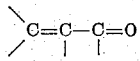

group with a hydrocarbon resin or terpene polymer required for the preparation of stable emulsions having good sizing efficiency. The amount of rosin included for this purpose is primarily dependent on the amount of such reaction product present and, in most cases, will not exceed about 25% by weight, based on the weight of terpene polymer. Preferred amounts are from about 2% to about 12% by weight, based on the weight of terpene polymer.

The term "rosin" as used herein is intended to embrace any of the usual types of rosin such as wood rosin, gum rosin and tall oil rosin in crude or refined state and/or after treatments of various kinds to increase its effectiveness for the intended purpose. It also includes modified rosins such as partially or substantially completely hydrogenated rosins and polymerized rosins, as well as rosins which have been heat treated, reacted with formaldehyde, or otherwise treated to inhibit crystallization of the rosin or sizes prepared therefrom.

Rosins containing or which have been admixed with various fortifying agents can also be used. Rosin compositions of this type are desirably prepared by reacting rosin with from one-twentieth to one mole, per mole of rosin, of an acidic compound containing the

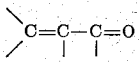

group including α,β-unsaturated monobasic and polybasic organic acids and acid anhydrides such as acrylic, maleic, fumaric, itaconic and citraconic acids and their anhydrides. Products of this type and methods of preparing and using same are well known as shown, for example, in U.S. 2,628,918 and 2,684,300. The fortifying agent may be reacted with the rosin before or after adding the hydrocarbon resin. Rosin compositions containing other types of fortifying agents such as the reaction product of a polymer of an acyclic terpene containing three double bonds per molecule with an acidic compound containing the

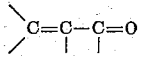

group including α,β-unsaturated monobasic and polybasic organic acids and acid anhydrides can also be used. Compositions of this type are described in copending application Serial No. 182,136, filed March 23, 1962.

Any of the rosins or rosin compositions above described may also include varying amounts of fatty acids or fatty acid mixtures. For example, there can be used a tall oil rosin fraction obtained by the fractional distillation of tall oil and containing up to several percent of a tall oil fatty acid mixture.

The emulsion sizes, prepared as hereinabove described, can be diluted to any desired concentration by adding cold water and stirring.

In the sizing of paper, the sizing compositions of the invention, preferably in the form of dilute aqueous emulsions of the type described above, are added to an aqueous suspension of paper pulp, as in the beater of a papermaking system, in an amount sufficient to supply from about 0.25% to about 10% by weight, based on the weight of dry pulp, of solids. The particular amount used will depend, of course, upon a number of factors such as the particular sizing composition, the nature of the pulp, the degree of sizing desired, and so on; but, in any case, is readily determinable by one skilled in the art. After thoroughly beating the mixture, aluminum sulfate or like fixing agent is added in suitable amounts, i.e., from about 0.5% to about 5% by weight, based on the dry weight of pulp, and the pulp then sheeted and dried in the usual manner.

The following specific examples will further illustrate the invention.

Examples 1-3

Two samples of terpene polymer resin having drop softening points of 68 and 72° C. were prepared as follows: 200 g. dry caustic-distilled refined southern sulfate turpentine was slowly added to an agitated dispersion of 18 g. $AlCl_3$ (anhydrous, powdered) in 470 g. dry toluene during a period of about one hour with external cooling at 7–10° C. Agitation was continued 4 hours at 8–9° C.

About 22 g. $H_2O$ was then added during 5 minutes at 9–10° C. with agitation, after which agitation was continued 7 minutes at 7–11° C. Following this, 45 g. $Ca(OH)_2$ (Smiths Lime Flour) was added and agitation continued 10 minutes at 10–11° C. The mixture was then heated to 70° C. in 10 minutes with agitation, held at this temperature for 15 minutes, and then filtered with suction. Solvent was evaporated using an oil bath for heat to a final oil bath temperature of 205° C./20 mm. The yield of polymer residue was 181 g. Drop softening point was 72° C., color WW, and percent Cl 0.184.

Three separate polymerizations were made utilizing the following reagents for each: 775 g. dry caustic-distilled refined southern sulfate turpentine, 1720 g. dry toluene, 70 g. $AlCl_3$ (anhydrous, powdered), 175 g. Smiths Lime Flour, and 87 g. $H_2O$.

In each run, the turpentine was added to the catalyst-solvent dispersion at 6–10° during a period of about 2.2 to 2.5 hours. Agitation was continued 4 hours at 8–12° C. Then the $H_2O$ was added in 10–15 minutes at 6–18° C. The Lime Flour was then added followed by continued agitation at 9–15° C. for 10 minutes. Temperature was then increased to 68–70° C. in 40–45 minutes with continued agitation, followed by 10 minutes' additional agitation at this temperature range. The mixture was then vacuum-filtered, the filter cake washed with toluene, and the washes added to the first filtrate. Filtrates from each run were combined. The total weight of filtrate was 7946 g. (percent combined Cl 0.11). Polymer content: 27.7% solids by evaporation as previously. Conversion to polymer: about 94.5%. Analysis of polymer: drop softening point 68° C., color WW–X range, percent Cl 0.14.

A blend of the above-described terpene polymer resins containing 134 parts of the resin having a softening point of 68° C. and 145 parts of the resin having a softening point of 72° C. was heated to 200° C. with good stirring and 7.1 parts of maleic anhydride added. The reaction was run in a glass flask without condenser. Heating at 200° C. was continued for 2½ hours.

A water-in-oil emulsion was prepared by adding aqueous KOH to a molten blend of 90 parts of the above mixture and 10 parts of rosin. The amount of KOH was sufficient to neutralize the calculated acidity of the blend. Additional water was added after the aqueous KOH until the emulsion inverted to an oil-in-water type emulsion. The resulting emulsion contained about 40% total solids.

The emulsion prepared as above described was diluted with water to a 3.0% emulsion and utilized in sizing according to the following procedure:

Bleached kraft pulp was beaten to a Schopper-Riegler freeness of 750±10 cc. at 4.5% pulp consistency. This pulp was diluted to 2.5% consistency and the pH adjusted to pH 7. The proper amount of size was added as a 3% aqueous emulsion. Sufficient papermakers' alum was then added to lower the pH of the slurry to about 4.3. This stock was then diluted to 0.25% consistency with pH 4.5 water containing 5 p.p.m. aluminum ion as alum. Sheets of paper were made in a Noble and Wood handsheet machine at 0.25% consistency using pH 4.5 water containing 5 p.p.m. aluminum ion as alum for diluting the pulp for the first sheet and recycle water for the remaining sheets. The sheets were pressed and dried and conditioned at 70° C., 50% relative humidity, and (beginning with the fourth sheet in each run) tested for sizing utilizing the Hercules photometer. Results are set forth in the following table:

TABLE 2

| Example No. | Percent size added (solids based on dry pulp) | Photometer sizing seconds [1] | |
|---|---|---|---|
| | | Lactic acid ink | Standard feather ink |
| 1 | 0.75 | 50 (37) | 111 (68) |
| 2 | 1.75 | 178 (64) | 250 (108) |
| 3 | 3.0 | 296 (93) | 416 (131) |

[1] Data in parentheses is for paper sized with rosin size.

*Examples 4 and 5*

Using essentially the polymerization procedure of Example 1, a resin was prepared using equal parts of western sulfate turpentine and isomerized α-pinene. A polymer was obtained with drop softening point of 70° C.

A maleic anhydride adduct of this resin was prepared from 128 g. resin and 3.3 g. maleic anhydride using the same method as used in Example 1.

A portion of this adduct was converted to an emulsion and evaluated as a size as in Examples 1–3. Results of sizing tests are given in the following table:

TABLE 3

| Example No. | Percent size added (solids based on dry pulp) | Photometer sizing seconds [1] standard feather ink |
|---|---|---|
| 4 | 0.75 | 82 (223) |
| 5 | 2.25 | 536 (427) |

[1] Data in parentheses is for paper sized with a fortified rosin size.

*Examples 6 and 7*

The procedure of Examples 4 and 5 was followed except that the feed for the polymer was 77.5% western turpentine and 22.5% β-pinene. The resin drop softening point was 73° C. Results of sizing tests with a bleached sulfite pulp are as follows:

TABLE 4

| Example No. | Percent size added (solids based on dry pulp) | Photometer sizing seconds [1] standard feather ink |
|---|---|---|
| 6 | 0.75 | 55 (112) |
| 7 | 2.25 | 681 (275) |

[1] Data in parentheses is for paper sized with a fortified rosin size.

*Example 8*

An emulsion was prepared using 60 parts of a resin made from southern turpentine, 40 parts of the maleic anhydride adduct of alloocimene dimer, 27.9 g. of KOH and water to give 38.3% total solids in the final emulsion. This emulsion gave sizing results similar to those in the above examples.

The maleic anhydride adduct of alloocimene dimer was prepared by heating 472 g. dimer and 181 g. maleic anhydride at 200–225° C. for 2 hours. The product was topped at 150–190° C. and 3 mm. pressure. The residue weighed 556 g. and had a drop softening point of 65.2° C., 12.3% neutrals and 0.3% free maleic anhydride.

*Example 9*

An emulsion was made using 60 parts of a resin made from southern turpentine, 40 parts of the maleic anhydride adduct of a liquid hydrocarbon polymer made by the clay treatment of gasoline (CTLA polymer, a dark viscous liquid of high unsaturates content, NVM, 94 wgt. percent; iodine No., 247 cg./g.; density at 60° F., 7.2 g./cc.; flash, C.O.C.=230° F.; produced by Enjay Chemical Company, Division of Humble Oil and Refining Company), 30.2 parts KOH and water to give 38.8% total solids in the final emulsion. This emulsion gave sizing results similar to those in the above examples.

The maleic anhydride adduct of CTLA polymer was prepared by heating 195 g. CTLA polymer and 105 g. maleic anhydride at 200–210° C. for 2 hours. The resulting product had a drop softening point of 104° C. and 3.8% free maleic anhydride.

It will thus be seen that the present invention provides novel and effective sizing compositions in the form of emulsions, as well as novel methods of sizing paper. While preferred embodiments of the invention have been described, it will be appreciated that various modifications thereof can be made without departing from the scope of the invention. For example, the compositions of the invention may include a hydrocarbon resin which may be in addition to the terpene polymer or resin or as a partial replacement therefor. Hydrocarbon resins derived by the polymerization of various petroleum fractions are particularly suitable for this purpose. Moreover, the compositions of the invention can be used in conjunction with other conventional papermaking ingredients which are not incompatible therewith in the papermaking process.

What we claim and desire to protect by Letters Patent is:

1. A paper sizing composition comprising an aqueous emulsion of an at least partially saponified mixture consisting essentially of a terpene resin consisting of the polymerization products of terpene hydrocarbons and from about 2% to about 100% by weight, based on the weight of terpene resin, of the reaction product of an acidic material containing the

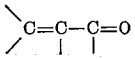

group with a terpene resin consisting of the polymerization products of terpene hydrocarbons.

2. A paper sizing composition in accordance with claim 1 wherein said reaction product is formed by reacting maleic anhydride with a terpene resin consisting of the polymerization products of terpene hydrocarbons.

3. A paper sizing composition in accordance with claim 2 wherein said reaction product is formed by reacting moleic anhydride with polymerized turpentine.

4. A paper sizing composition in accordance with claim 2 wherein said reaction product is formed by reacting maleic anhydride with a terpene dimer.

5. A paper sizing composition comprising an aqueous oil-in-water type emulsion of an at least partially saponified mixture consisting essentially of a terpene resin consisting of the polymerization products of terpene hydrocarbons and from about 2% to about 100% by weight, based on the weight of terpene resin, of the reaction product formed by reacting the terpene resin with a material selected from the group consisting of acrylonitrile, α,β-unsaturated carboxylic acids, and anhydrides of α,β-unsaturated carboxylic acids.

6. A paper sizing composition in accordance with claim 5 in which said reaction product is formed by reacting said terpene resin with fumaric acid.

7. A paper sizing composition comprising an aqueous oil-in-water type emulsion of an at least partially saponified mixture consisting essentially of a terpene resin consisting of the polymerization products of terpene hydrocarbons, up to about 25% by weight, based on the weight of terpene resin, of rosin, and from about 2% to about 100% by weight, based on the weight of terpene resin, of the reaction product of a material selected from the group consisting of acrylonitrile, α,β-unsaturated carboxylic acids and anhydrides of α,β-unsaturated carboxylic acids with a terpene resin consisting of the polymerization products of terpene hydrocarbons.

8. The method of sizing paper which comprises forming an aqueous suspension of paper pulp, adding to the pulp an aqueous at least partially saponified dispersion consisting essentially of a terpene resin consisting of the polymerization products of terpene hydrocarbons and from about 2% to about 100% by weight, based on the weight of terpene resin, of the reaction product of a material selected from the group consisting of acrylonitrile, α,β-unsaturated carboxylic acids, and anhydrides of α,β-unsaturated carboxylic acids with a terpene resin consisting of the polymerization products of terpene hydrocarbons, admixing with the pulp from about 1% to about 5% of aluminum sulfate, and then forming the pulp into sheets.

9. The method of sizing paper which comprises forming an aqueous suspension of paper pulp, adding to the pulp an aqueous at least partially saponified dispersion consisting essentially of a terpene resin consisting of the polymerization products of terpene hydrocarbons, up to about 25% by weight, based on the weight of terpene resin, of rosin, and from about 2% to about 100% by weight, based on the weight of terpene resin, of the reaction product of a material selected from the group consisting of acrylonitrile, α,β-unsaturated carboxylic acids and anhydrides of α,β-unsaturated carboxylic acids with a terpene resin consisting of the polymerization products of terpene hydrocarbons, the amount of said aqueous dispersion being sufficient to supply from about 0.25% to about 10% by weight, based on the weight of dry pulp, of said terpene resin and reaction product, admixing with the pulp from about 1% to about 5% of aluminum sulfate and then forming the pulp into sheets.

10. Paper sized with from about ¼% to about 10% by weight, based on the weight of paper, of a sizing agent consisting essentially of a terpene resin consisting of the polymerization products of terpene hydrocarbons and from about 2% to about 100% by weight, based on the weight of terpene resin, of the reaction product of a material selected from the group consisting of acrylonitrile, α,β-unsaturated carboxylic acids, and anhydrides of α,β-unsaturated carboxylic acids with a terpene resin consisting of the polymerization products of terpene hydrocarbons.

11. Paper sized with from about ¼% to about 10% by weight, based on the weight of paper, of a sizing agent consisting essentially of a terpene resin consisting of the polymerization products of terpene hydrocarbons, up to about 25% by weight, based on the weight of terpene resin, of rosin, and from about 2% to about 100% by weight, based on the weight of terpene resin, of the reaction product of a material selected from the group consisting of acrylonitrile, α,β-unsaturated carboxylic acids, and anhydrides of α,β-unsaturated carboxylic acids with a terpene resin consisting of the polymerization products of terpene hydrocarbons.

References Cited by the Examiner

UNITED STATES PATENTS

| | | | |
|---|---|---|---|
| 1,948,442 | 2/34 | Ellis | 162—168 |
| 1,997,366 | 4/35 | Kern | 162—180 |
| 2,346,791 | 4/44 | Rummelsburg | 260—93.3 |
| 2,347,970 | 5/44 | Rummelsburg | 260—93.3 |
| 2,354,574 | 7/44 | Carson | 260—93.3 |
| 2,503,407 | 4/50 | Perry | 162—180 |
| 2,534,703 | 12/50 | Fenelon et al. | 162—180 |
| 2,802,813 | 8/57 | Maguire et al. | 260—93.3 |
| 2,994,635 | 8/61 | Reaville et al. | 162—179 |

FOREIGN PATENTS

| | | |
|---|---|---|
| 541,670 | 12/41 | Great Britain. |
| 633,332 | 12/49 | Great Britain. |

DONALL H. SYLVESTER, *Primary Examiner.*

MORRIS O. WOLK, WILLIAM B. KNIGHT, *Examiners.*